US012807354B2

(12) United States Patent
Bosboom et al.

(10) Patent No.: US 12,807,354 B2
(45) Date of Patent: Nov. 24, 2026

(54) FLIPPING TRAY PICKER GANTRY

(71) Applicant: JABIL INC., St. Petersburg, FL (US)

(72) Inventors: Jeroen Bosboom, St. Petersburg, FL (US); Babak Naderi, St. Petersburg, FL (US); Michael Mckenney, St. Petersburg, FL (US); Lucas Nielsen, St. Petersburg, FL (US)

(73) Assignee: JABIL INC.

( * ) Notice: Subject to any disclaimer, the term of this patent is extended or adjusted under 35 U.S.C. 154(b) by 52 days.

(21) Appl. No.: 18/865,703

(22) PCT Filed: May 30, 2023

(86) PCT No.: PCT/US2023/023856
§ 371 (c)(1),
(2) Date: Nov. 14, 2024

(87) PCT Pub. No.: WO2023/230377
PCT Pub. Date: Nov. 30, 2023

(65) Prior Publication Data

US 2025/0353629 A1 Nov. 20, 2025

Related U.S. Application Data

(60) Provisional application No. 63/346,564, filed on May 27, 2022.

(51) Int. Cl.
*B65B 35/38* (2006.01)
*B25J 9/02* (2006.01)
(Continued)

(52) U.S. Cl.
CPC ............... *B65B 35/38* (2013.01); *B25J 9/026* (2013.01); *B65B 5/08* (2013.01); *B65B 65/00* (2013.01);
(Continued)

(58) Field of Classification Search
CPC . B65B 35/38; B65B 5/08; B65B 65/00; B25J 9/026; B65G 47/91; B65G 2201/0258; B65G 47/252
(Continued)

(56) References Cited

U.S. PATENT DOCUMENTS 4,232,777 A * 11/1980 Smith .................. B65G 47/252 198/463.4
6,353,774 B1 * 3/2002 Goldenberg ....... G01N 35/0099 29/431
(Continued)

FOREIGN PATENT DOCUMENTS

CN 117262733 A * 12/2023 ............. B65G 47/91
EP 3904246 A1 11/2021
(Continued)

*Primary Examiner* — James R Bidwell
(74) *Attorney, Agent, or Firm* — Riverside Law LLP

(57) ABSTRACT

An apparatus, system and method for a flipping tray picker gantry. The embodiments include at least: a flipping bridge associated with an actuating motor; at least one x-axis drive suitable to move the flipping bridge perpendicularly to a length of rows of items in a pick tray; at least one z-axis drive suitable to move the flipping bridge both up and down with respect to the pick tray; and a plurality of grippers associated with the flipping bridge and suitable for gripping the items when the flipping bridge moves down in the z-axis, and retaining the items as the flipping bridge moves up in the z-axis and the actuating motor flips the flipping bridge.

19 Claims, 11 Drawing Sheets

(51) Int. Cl.

| | |
|---|---|
| ***B65B 5/08*** | (2006.01) |
| ***B65B 65/00*** | (2006.01) |
| ***B65G 47/252*** | (2006.01) |
| ***B65G 47/91*** | (2006.01) |

(52) U.S. Cl.
CPC ............ *B65G 47/91* (2013.01); *B65G 47/252* (2013.01); *B65G 2201/0258* (2013.01)

(58) Field of Classification Search
USPC .................................................. 198/403, 404
See application file for complete search history.

(56) References Cited

U.S. PATENT DOCUMENTS

| | | | | |
|---|---|---|---|---|
| 6,773,543 | B2 * | 8/2004 | Summers ............ | H10P 72/0446 156/707 |
| 9,783,372 | B2 * | 10/2017 | De Block ............ | B65G 47/248 |
| 2003/0086780 | A1 | 5/2003 | Eisenzimmer | |
| 2003/0201549 | A1 * | 10/2003 | Shindo .................... | H10P 72/78 257/798 |
| 2012/0210554 | A1 * | 8/2012 | Han .................. | H10W 72/0711 29/700 |
| 2013/0295721 | A1 | 11/2013 | Lyu | |
| 2023/0079162 | A1 * | 3/2023 | Grassl .................... | B65H 5/222 198/403 |

FOREIGN PATENT DOCUMENTS

| | | |
|---|---|---|
| JP | H05319572 | 12/1993 |
| JP | 2005178916 A | 7/2005 |
| JP | 2016092427 | 5/2016 |
| KR | 20170107540 | 9/2017 |
| KR | 20190079520 | 7/2019 |

* cited by examiner

FLIPPING TRAY PICKER GANTRY

CROSS-REFERENCE TO RELATED APPLICATION

This application is a U.S. national phase application filed under 35 U.S.C. § 371 claiming benefit to International Patent Application No. PCT/US23/23856, filed May 30, 2023, which is entitled to priority of U.S. Provisional Patent Application No. 63/346,564, filed May 27, 2022, the contents of which are each incorporated by reference herein in their entirety.

BACKGROUND

Field of the Disclosure

The present disclosure relates to robotics-based processing, and particularly, to an apparatus, system and method related to a flipping tray picker gantry.

Description of the Background

During manufacturing processes in general, and particularly during the manufacture of pharmaceuticals and health-care products, various sorting and packaging methods must be employed. For example, it is often the case during manufacturing that products placed into input trays having slots, sleeves, recesses, of the like must subsequently be flipped over to be moved into the shipping package. This process is most simply performed by flipping over the entire tray, such as after registering/aligning the slots, sleeves, or recesses containing the product with the portion of the packaging into which each discrete division of product will be placed for shipping.

In order to improve production quality and to increase production volumes, automating this type of flipping process has proven highly effective and cost-effective. However, automating the flipping of a large tray having discrete product runs the risk of disorganizing the discrete product/components, such as by losing the registration positioning. For example, pharmaceuticals may be dispensed into blister pocket packaging upon flipping of a tray holding the discrete portions of the pharmaceutical, but if the flipping occurs too slowly or too quickly then the registration between the pharmaceuticals and their respective blister pockets may be broken, and the pharmaceuticals may fall outside the blister pack confinement intended for that pharmaceutical. Thereby, the manufacturing process would break down.

Therefore, the need exists for a manufacturing element that allows for the flipping of a tray of product into its intended packaging in proper registration.

SUMMARY

An apparatus, system and method for a flipping tray picker gantry is disclosed. The embodiments include at least: a flipping bridge associated with an actuating motor; at least one x-axis drive suitable to move the flipping bridge perpendicularly to a length of rows of items in a pick tray; at least one z-axis drive suitable to move the flipping bridge both up and down with respect to the pick tray; and a plurality of grippers associated with the flipping bridge and suitable for gripping the items when the flipping bridge moves down in the z-axis, and retaining the items as the flipping bridge moves up in the z-axis and the actuating motor flips the flipping bridge.

Therefore, the embodiments provide a manufacturing element that allows for the flipping of a tray of product into its intended packaging in proper registration.

BRIEF DESCRIPTION OF THE DRAWINGS

The exemplary apparatuses, systems, and methods shall be described hereinafter with reference to the attached drawing, which are given by way of non-limiting example only, and in which.

DETAILED DESCRIPTION

Figure 1:
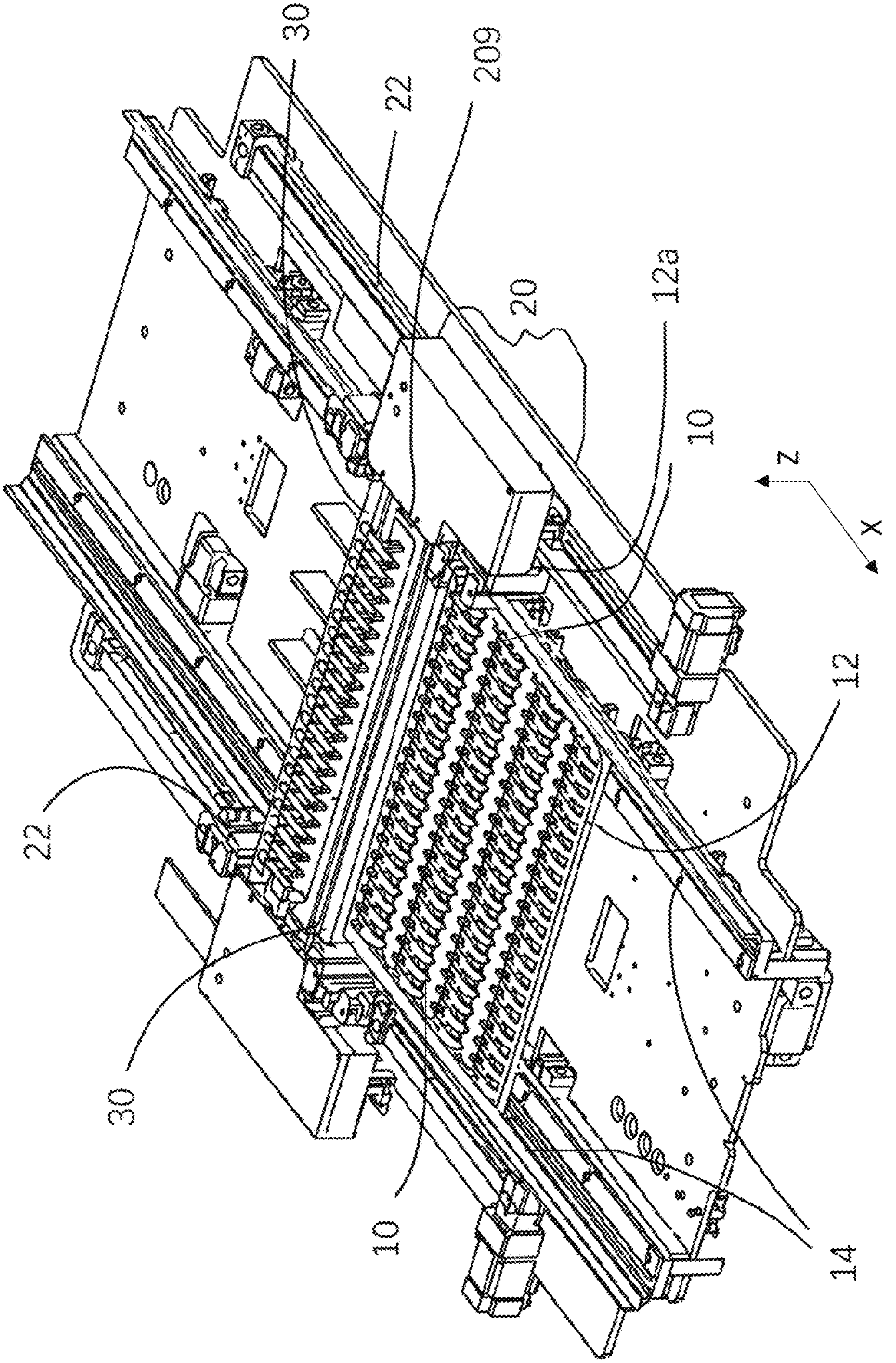
FIG. 1 illustrates aspects of a tray picking flipper gantry.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on," "upon," "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosed gantry picking flipper provides, among other advantages, flexible product/item presentation from conveyor-guided trays. The gantry flipper operates with three-axis movement, with x, z and theta operation, and may include a y-axis/item pitch operation. The flipper may operate decoupled from a secondary part handling/placement tray robot/end effector, and works efficiently within a small work envelope.

The flow of trays typically originates in a buffer station from which part/product "pick trays" flow out onto a conveyor that transports the trays sequentially to a specific work zone. Once stopped in the work zone of the gantry flipper, the flipper incrementally picks and presents rows of tray content to a secondary robot, for example. More specifically, the gantry flipper's bridge settles across the conveyor above a tray row, and extends down in the z-axis to pick the parts, such as by vacuum cup grippers or mechanically clasping grippers. The gantry flipper's tooling may then rotate the row of parts, such as by 180 degrees, using the gantry flipper bridge. The parts may then be picked for placement by a secondary robot. As each row is emptied, the gantry x-axis may be programmed to advance to the next row of parts in the tray.

The gantry flipper may feature rapidly interchangeable, cassette-style tooling plates, located in a receiver cradle plate spanning the twin x-axis. The cradle tooling may be equipped with spring-loaded electrical contacts and an o-ring interface for power, I/O, and pneumatics, such as may be provided via an electrical slip ring and on a pneumatically sealed rotating ball bearing fitting on each side of the bridge plate.

The electrical and pneumatic slip ring may reduce the vertical overhead of the device. The variability provided, in part, by the slip ring, allows for the presentation of parts parallel to the tray, vertically or at other angles, depending on the placement needs. In addition to handing off picked components, the tooling may also perform other value-added operations, like scanning barcodes, assembly, painting, coating, laser marking, test operations, etc. and additionally replacement of parts back into respective tray pockets after these operations.

The tooling plate may have a pneumatic plenum(s) for vacuum, pressure, or both. These may supply the individual valves that control each vacuum cup set or double acting part gripper. This may allow the tooling to selectively omit picking rejected parts from trays, such as may occur using on the fly inspection, and to selectively release parts to the secondary end effector/pick robot. That is, the grippers/cups may affirmatively release an item, rather than being plucked.

Since blow molded plastic trays are subject to dimensional variability, the gantry flipper tooling may include lateral tray centering slides/rails to improve lateral positioning. Between this fact and the fact that trays may be sequentially emptied row by row, the risk of losing component/item registration is substantially eliminated in the embodiments. This is the case for nearly any number of parts per row using the embodiments.

The flipper bridge may span across the entire tray row, and thus may span between two linear servos (x-axis actuators), and may additionally have a guided vertical actuator assembly on each side of the flipper bridge outside the conveyer limits (z-axis actuators). A rotary servo may link from the tooling plate directly to the flipper bridge to provide the theta axis actuator. The tooling plate may additionally incorporate quick disconnects for electrical, vacuum, or pneumatic supply service.

The gantry flipper may have a simplistic tool changer interface. That is, new tooling modules/flipper bridges/gripper numbers can be rapidly interchanged, such as with simple hand tools. For example, 16-20 or more individually addressable \ controlled grippers may be provided on various, readily interchangeable flipper modules.

A y-axis adjustment for the grippers may match the tray pitch positions. This may additionally remedy process limitations where the pick row count/pitch and placement requirement do not match. For example, a tray row of eight parts may be picked, but the placement may require 5 parts per row. Thus, on the first pick and place the place requirement is met, but on the second place the placing robot is 2 parts short. In such an embodiment, the flipper can fill the allotment by the time the robot returns, avoiding excess cycle time. Thus, a 40 part tray can be picked in 8 uninterrupted cycles, instead of waiting for repeated partial refreshes.

More particularly, the embodiments provide a flipping end effector capable of picking parts with different pitches and orientations, and/or different parts altogether, and flipping the orientation of those parts for placement, such as in a place tray. For example, parts may be picked from a pick tray in a first orientation and may be "flipped" by 180 degrees to a second orientation for placement into a place tray. Such an embodiment may occur, for example, in a situation in which medical items are loaded "upside down" into a blister pack from the respective orientation in the pick tray.

In FIG. 1, an embodiment is illustrated in which small parts 10 are in a first orientation in a pick tray 12 on a conveyer 14. A flipping gantry 20 is illustrated above the pick tray 12. The gantry 20 shown has two drives 22 in the x-axis, each running perpendicularly to the length of the flipper on either side of the flipper bridge 20*a*; and the flipping bridge 20*a* between front and rear lateral frame centering rails 30 which also run perpendicularly to the x-axis drives 22.

The x-drives 22 may move the gantry flipper 20 sequentially from row to row of tray 12, and at each row the flipping gripper bridge 20*a* may pick the items in the row and flip that tray row 12*a* of items 10. The flipped items may then be "handed off" for placement, or the gantry flipper 20 may, for example, be robotically spun as an end effector over a placement tray (such as on a perpendicular conveyer) for placement.

Figure 2:
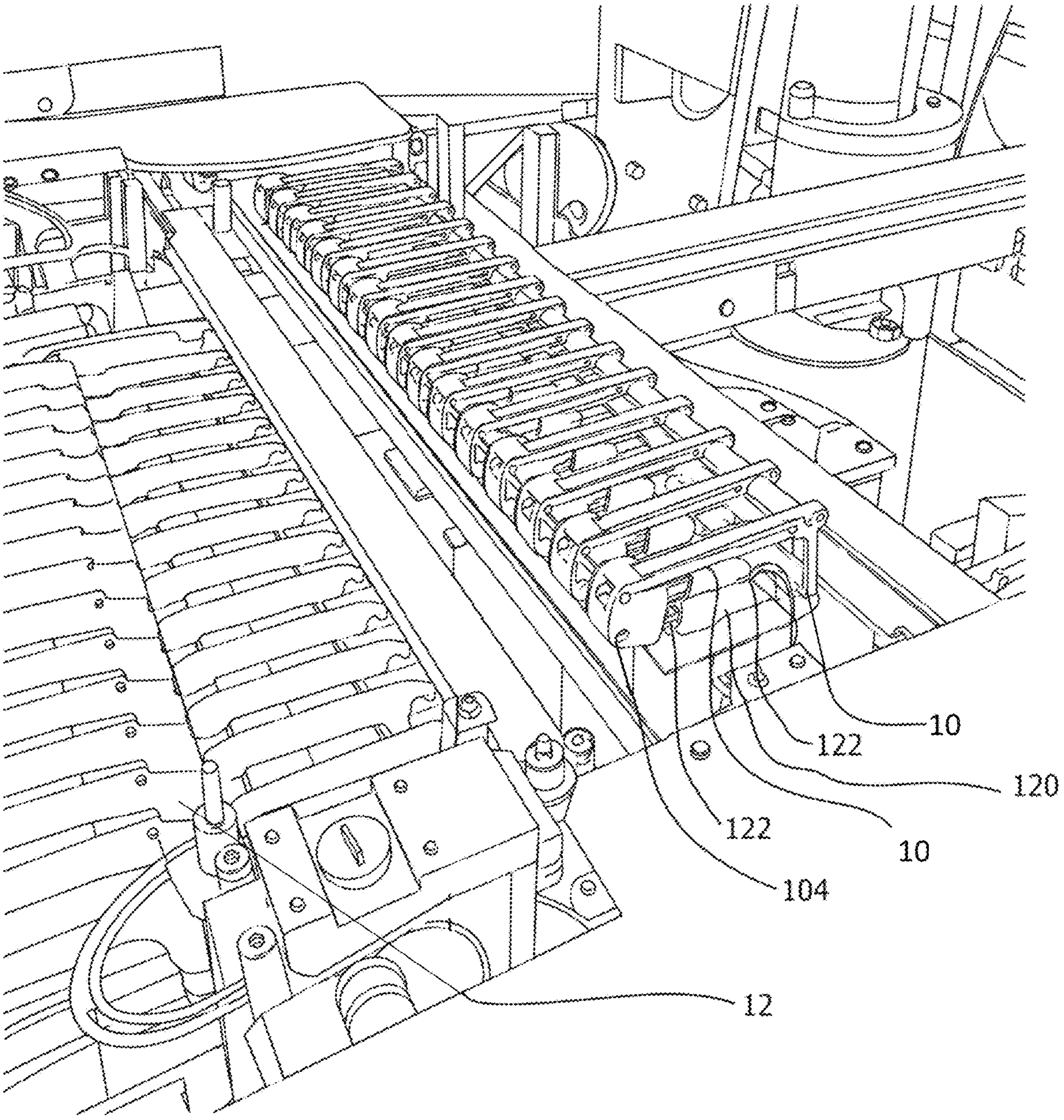
FIG. 2 illustrates aspects of a tray picking flipper gantry.

(Slide 3) For example, in FIG. 2, the components 10 are flipped for the placement tray with respect to the orientation in the pick tray 12. These components 10 are now ready to be picked anew in the proper orientation. Of note, the embodiment illustrated includes justifiers 104 that justify the part, such as to improve the secondary picking for the placement tray. Such justifiers 104 may shift the justification of the item 10 placed after the change in orientation, such as moving the item forward, back, to the right or left, or changing the relative angle of aspects of the item 10, as the item is placed by the gantry flipper 20. Justifiers 104 may additionally allow for variations in the item size placed for moving to the placement tray, such as by allowing shorter derivatives of a part to be justified forward in the same placement tray pockets/rows 12*a* also used for comparable but longer items.

The illustration also shows vacuum tooling 120, such as 16 position vacuum tooling. Also shown are a plurality of vacuum cups 122, including debris removal.

Figure 3:
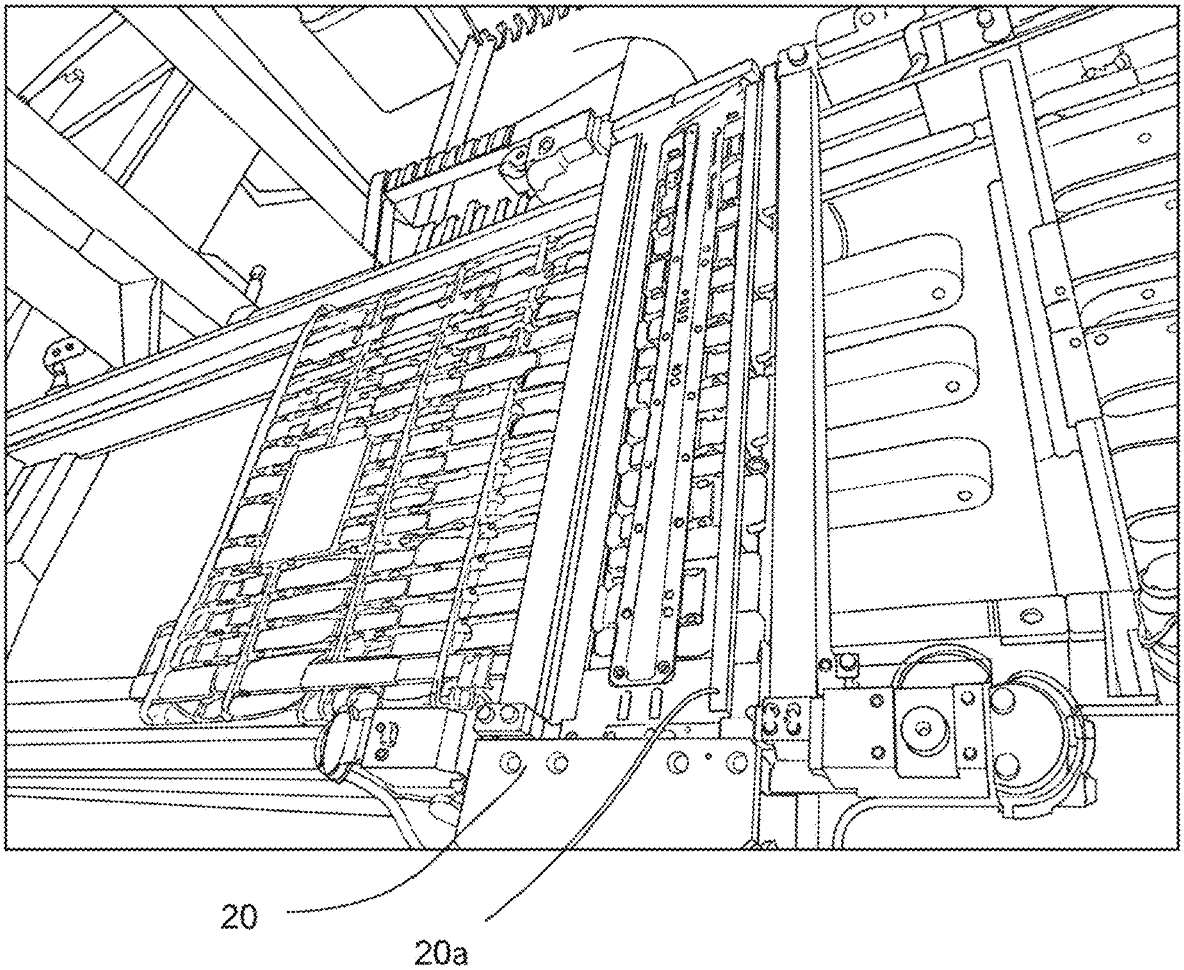
FIG. 3 illustrates aspects of a tray picking flipper gantry.

FIG. 3 illustrates the gantry flipper 20 in profile, with flipper bridge 20*a* in a partly rotated position. The flipper may have a theta axis rotation capability 202 through 360 degrees, or may have a different angular limit in accordance with a given application, such as 180 degrees. The flipper bridge 20*a* and its associated tooling may preferably have a very low profile to improve robot clearance over the tooling.

Moreover and as discussed throughout, the flipper bridge 20*a* may have a variable clearance 210 due to movement capabilities 222 provided to the bridge 20*a* in the z-axis. The flipper bridge 20 also provides movement along the x-axis, as mentioned above, so as to be capable of "moving along" rows 12*a* of a tray 12 to thereby enable picking from and placing to successive rows 12*a*.

Figure 4A:
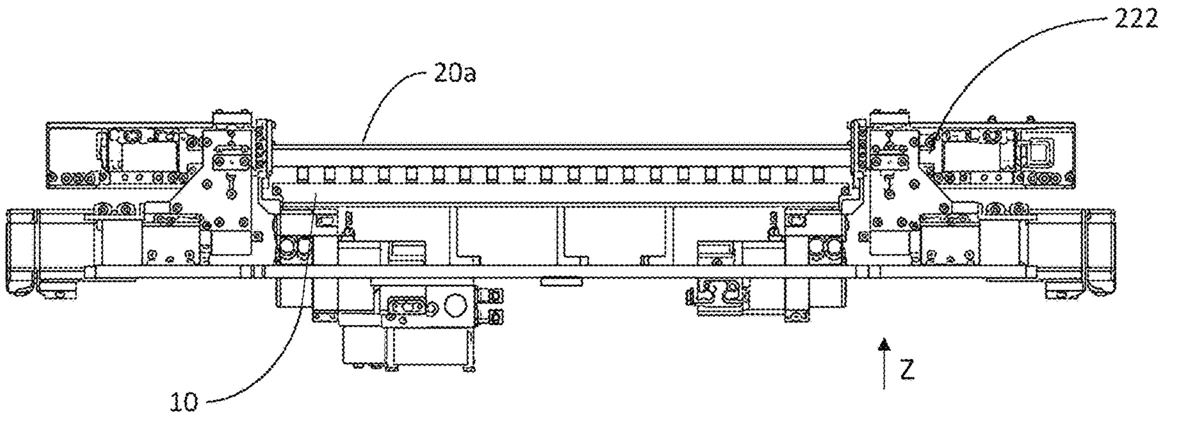
FIGS. 4A, B and C illustrate aspects of a tray picking flipper gantry.
Figure 4B:
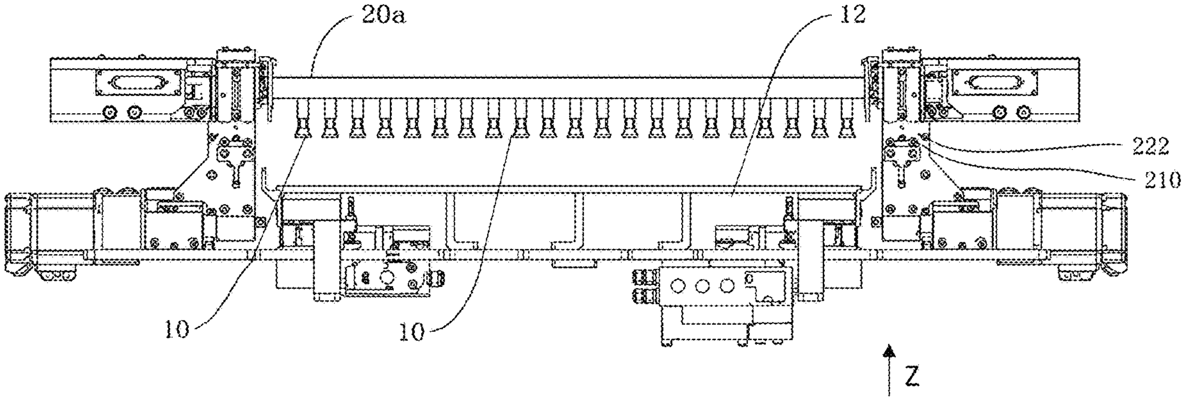
Figure 4C:
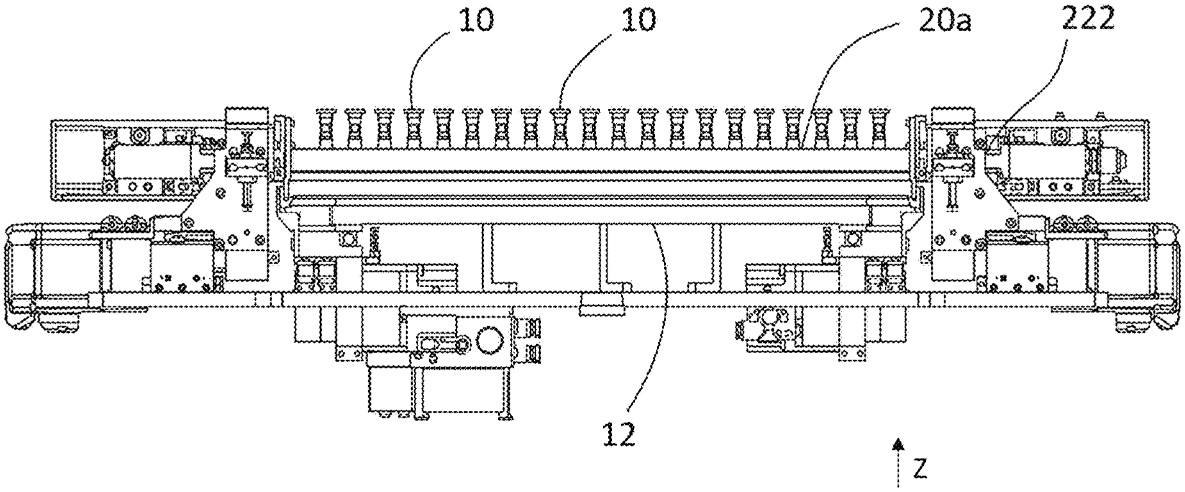

(Slide 5) FIGS. 4A, B and C (Slide 6) respectively illustrate the gantry flipper bridge 20*a* lowered in the z-axis to pick components 10 from a pick tray 12; the flipper bridge 20*a* raised in the z-axis with the picked items 10, both to clear the pick tray 12 and to create clearance for eventual rotation of the flipper bridge 20*a*; and the rotation of the picked items 10 by 180 degrees to allow for the secondary pick from the flipper bridge 20*a* in the correct orientation for that secondary pick. Additionally, the z-axis actuator 222 has lowered the flipper bridge 20*a* in the FIG. 4C to allow for sufficient clearance for the robot performing the secondary pick. The z-axis actuation 222 is also evident in FIG. 4A as compared to 4B (from the z-axis lowered position in A to the raised position in B).

Figure 5A:
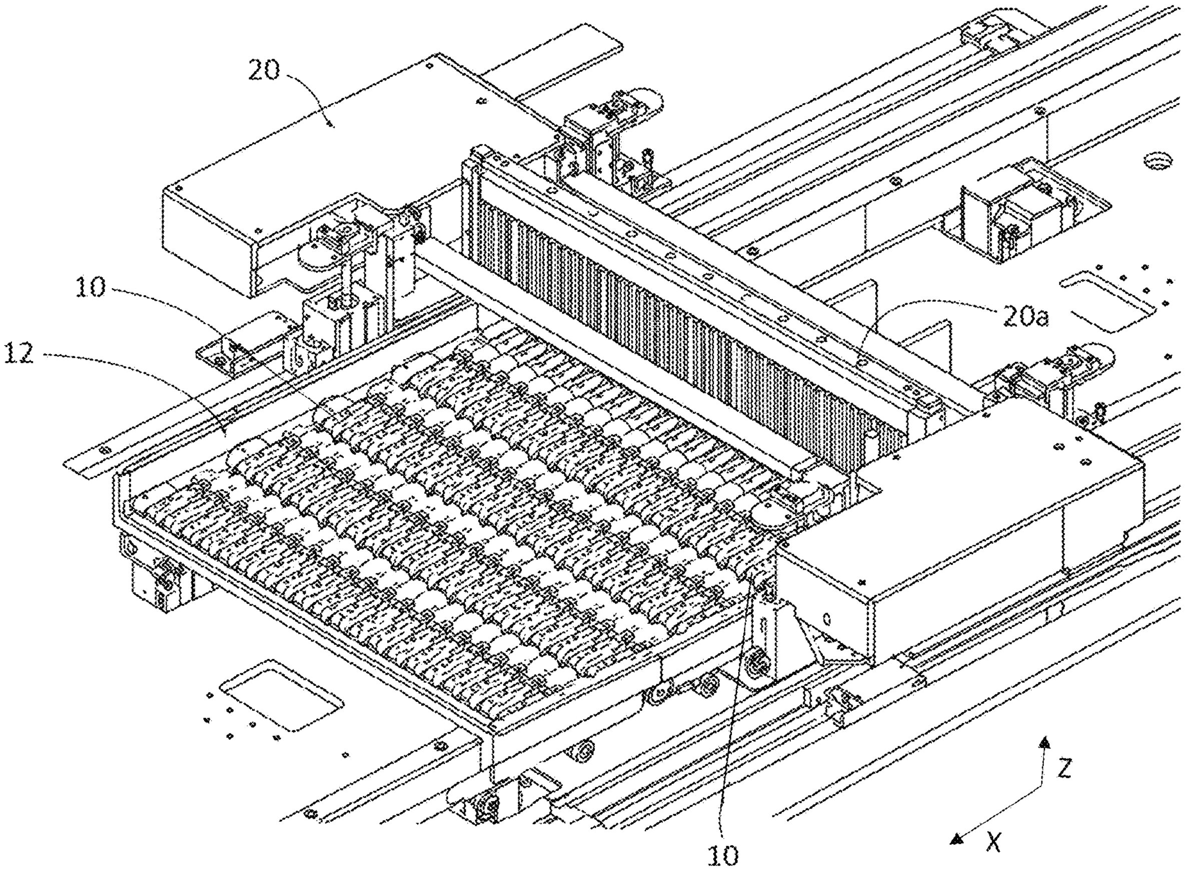
FIGS. 5A and B illustrates aspects of a tray picking flipper gantry.
Figure 5B:
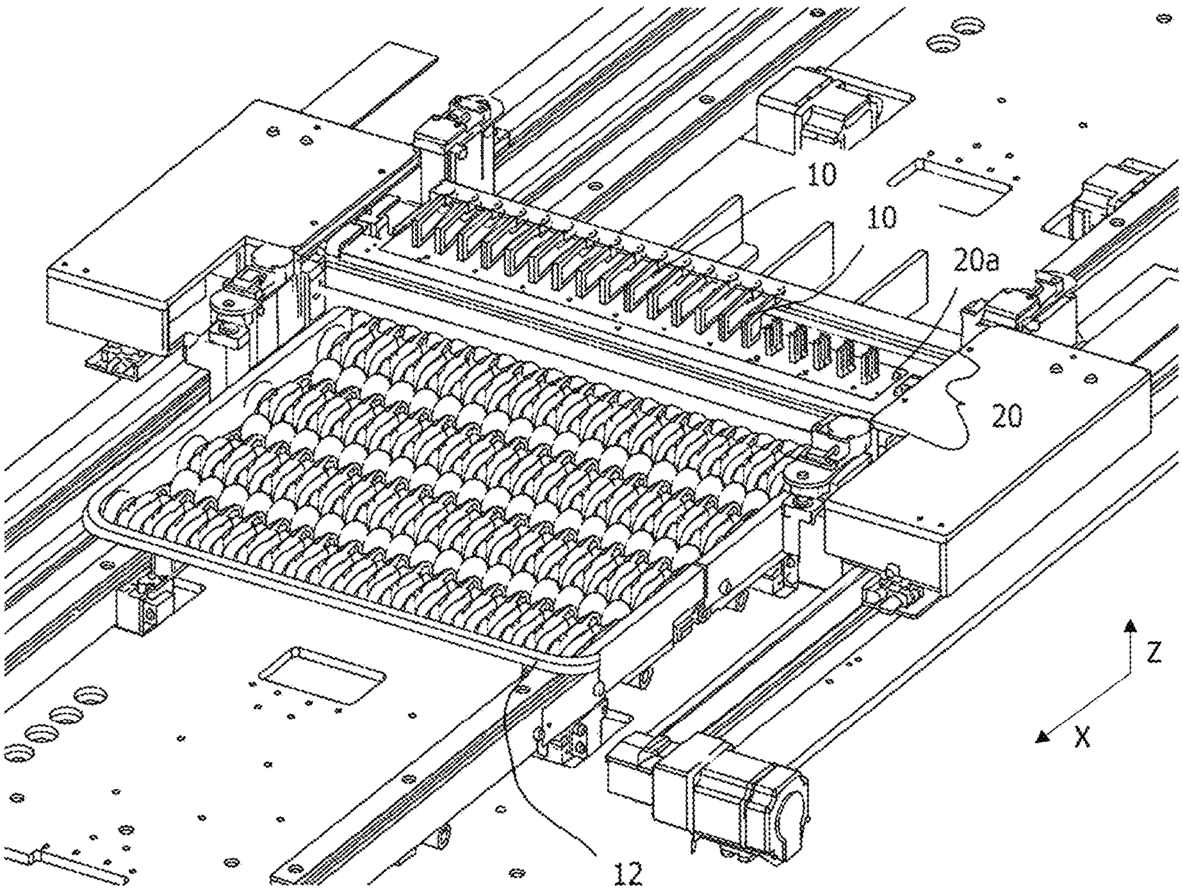

FIGS. 5A and B similarly illustrate the gantry flipper 20 performing a pick from a component pick tray 12. In the illustration, the flipper bridge 20*a* is first shown halfway through its flip, while raised in the z-axis so as to clear the component tray 12. The flipper bridge 20*a* is then shown after the full rotation, and after lowering in the z-axis to provide clearance for the secondary picking robot above.

Of note, the components 10 may be released on demand upon the secondary pick. Thus, the flipper bridge 20*a* may include retention valves (either or both of horizontally and vertically adjacent each picked item), grippers (such as pincers, clasps, or forks), or the like, and these may be electrically, mechanically, and/or pneumatically actuated and de-actuated on demand to respectively grasp and then release the items 10. This retention may be uniquely actuatable/controllable for each gripper head, i.e., for each item picked, or the retention may be universally actuatable for all grippers simultaneously.

The flipper bridge 20*a* may be rotated by, for example, a servo motor along the lateral axis at one side of the bridge 20*a*. The servo may rotate continuously (such as in conjunction with the z-axis actuator), or may be positionally encoded to rotate to certain positions at a certain rate.

Moreover, to enable this rotation, electrical and/or pneumatic lines must be accounted for. If rotation occurs absent this design concern, wires and pneumatic lines may twist, crimp, tear, be pinched, or otherwise fail to provide proper operation to the embodiments. Consequently, such lines may be run via one or more slip rings, slip joints, or the like, to allow for full and repeated rotation without impeding line functionality.

Figure 6:
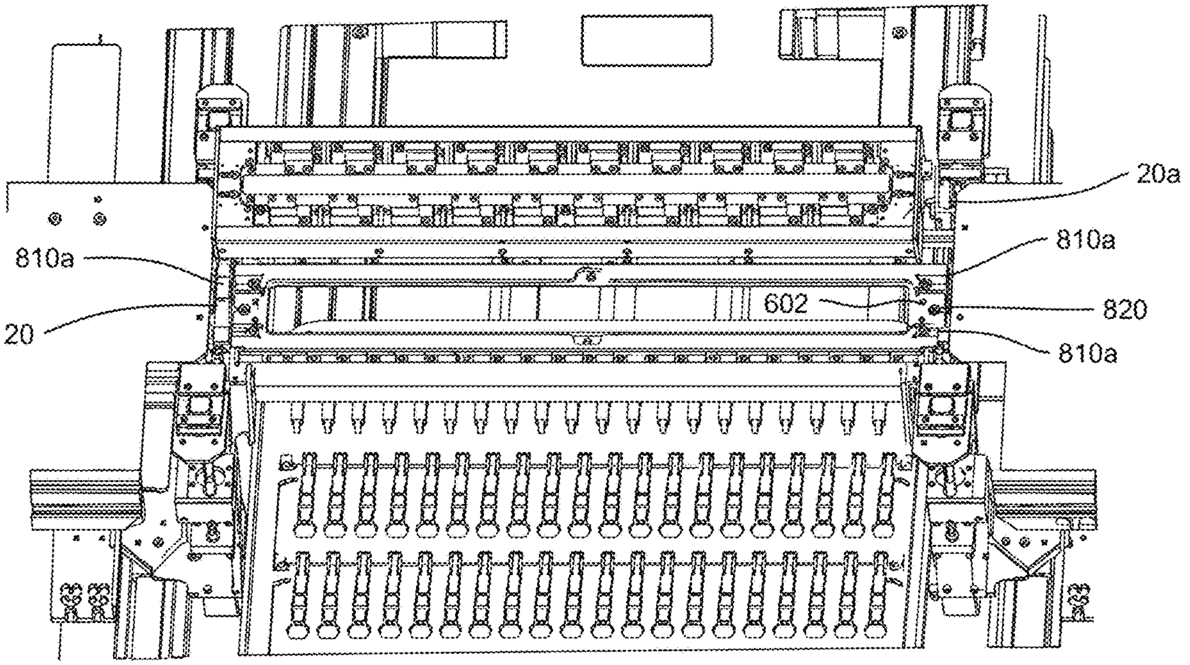
FIG. 6 illustrates aspects of a tray picking flipper gantry.

FIG. 6 illustrates the detachable nature of certain embodiments. The flipper bridge 20*a* may electrically connect to its frame 20 (and thus its electrical feed lines) via contact pads, and may pneumatically connect to the frame via one or more detachable vacuum clip lines. Accordingly, set screws 602, such as 2-10 set screws, or more particularly 6 set screws, may be all that holds the flipper in place, and removal of those set screws may simplistically allow for interchanging of the flipper bridges 20*a*, such as to insert bridges having different grippers, different numbers of grippers, different gripper pitches or angles, or different rotation capabilities, by way of example.

Figure 7:
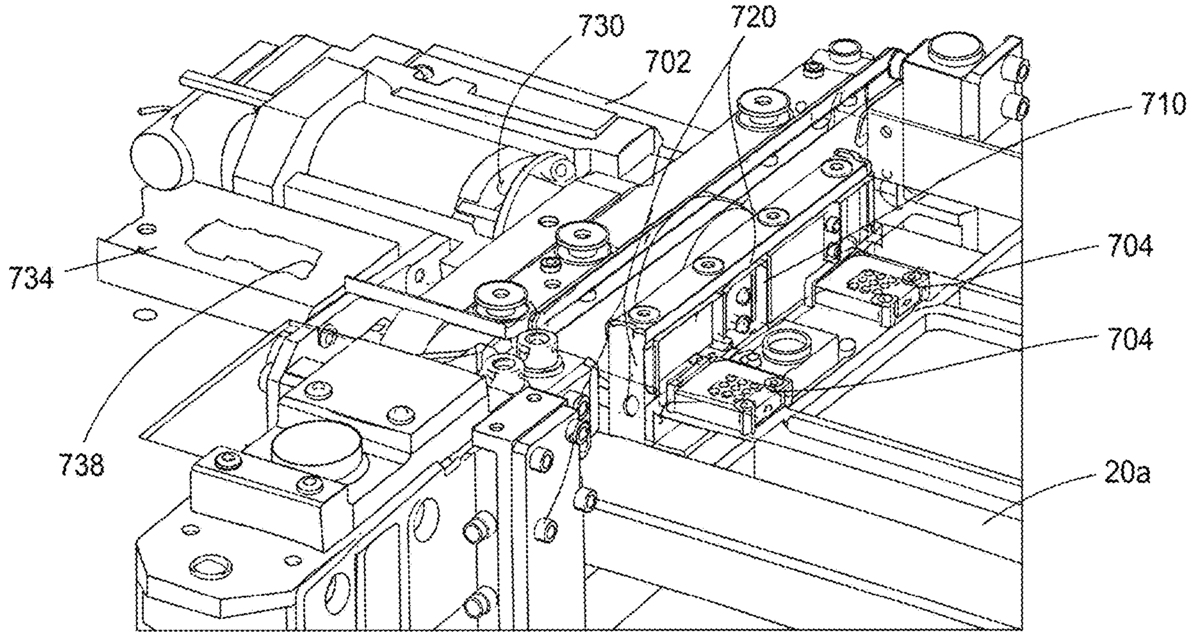
FIG. 7 illustrates aspects of a tray picking flipper gantry.

FIG. 7 illustrates aspects of the embodiments, with the flipper bridge 20*a* and the gantry top plate 702 in ghost. As shown, the aforementioned electrical contacts 704 may allow ready-removal of the flipper bridge 20*a*, and may provide electrical I/O signaling and power upon placement into contact of a corresponding pad on the flipper bridge.

Also evident is the "drop-in" connection 710 of the flipper bridge 20*a* to the theta bearings/drive belt/drive shaft system provided on the control block under the gantry top plate. Also shown is dual port slip ring harness routing 720, which may include pneumatics routing as shown.

Additionally, the illustration includes a hollow electrical slip ring 730, through which may pass the power and IVO that are fed through the slip ring routing mentioned above. Yet further, shown in physical association with the theta axis bearings and drive belt is the housing cover 734 for the theta servo motor 738 discussed throughout.

Figure 8:
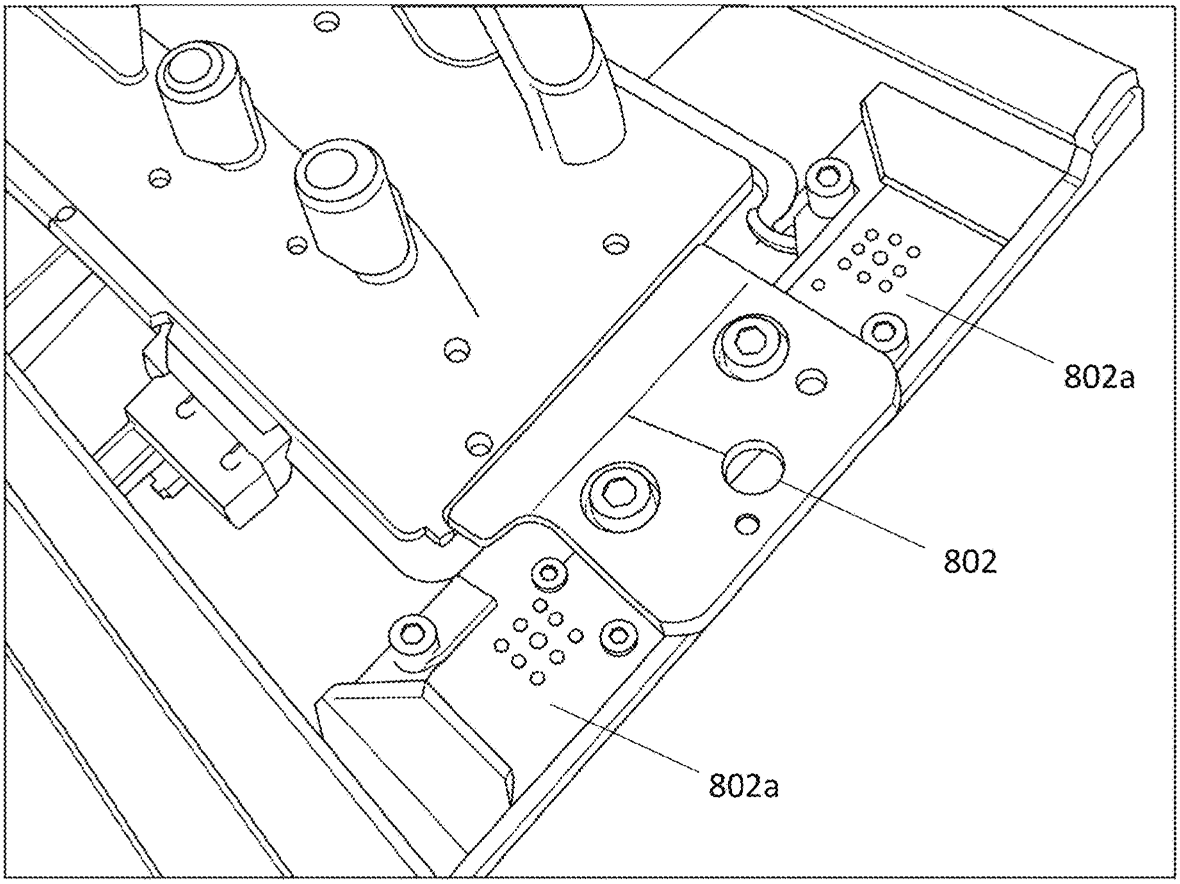
FIG. 8 illustrates aspects of a tray picking flipper gantry.

(Slide 11) FIG. 8 illustrates an exemplary interface for the flipper bridge 20*a* to mate to the control block 802 and gantry frame 20. Illustrated are electrical contact pads 802*a* on the flipper bridge 20*a* to mate with those illustrated above on the gantry frame. Also shown is a self-aligning pneumatic interface 820 (although one is shown, there may be more than one) for mating to the aforementioned pneumatic feed from the slip ring routing of the control block.

Figure 9B:
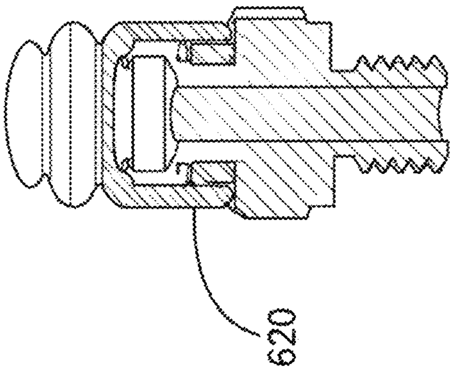
FIGS. 9A and 9B illustrate aspects of a tray picking flipper gantry.
Figure 9A:
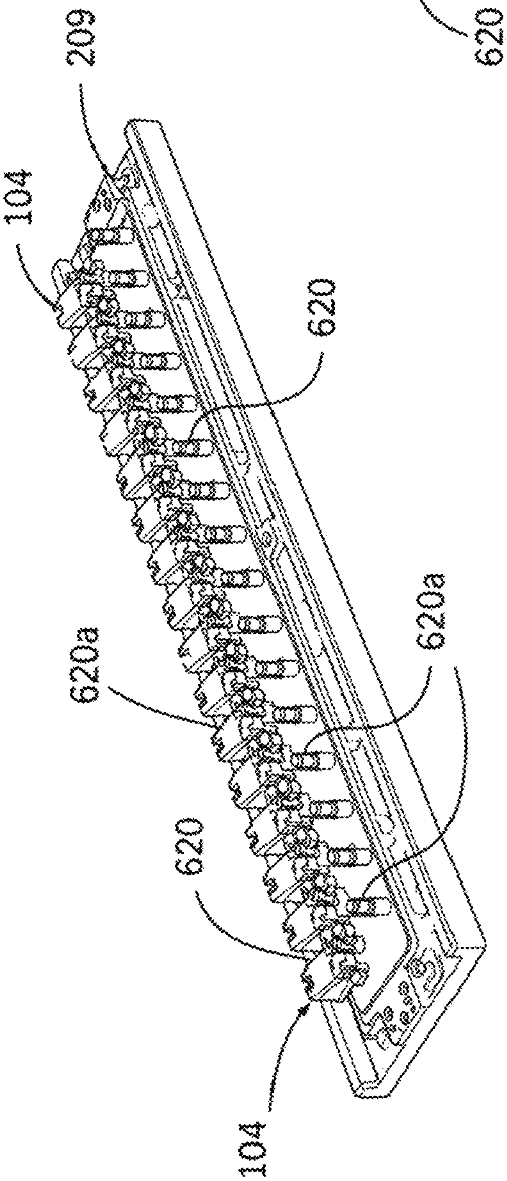

FIGS. 9A and B illustrate vacuum port grippers 620 on the flipper bridge 20*a*. These vacuum ports 620*a* may be filtered (such as to avoid debris), and allow for a suction gripping of an individual item 10, once picked, to the flipper bridge 20*a* for flipping. Sixteen vacuum grippers 620 are shown, although any number of grippers may be used dependent upon the number of items to be picked in each row of a pick tray. Also as shown, justifiers 104 may be included in conjunction with the grippers, as discussed herein above.

Figure 10:
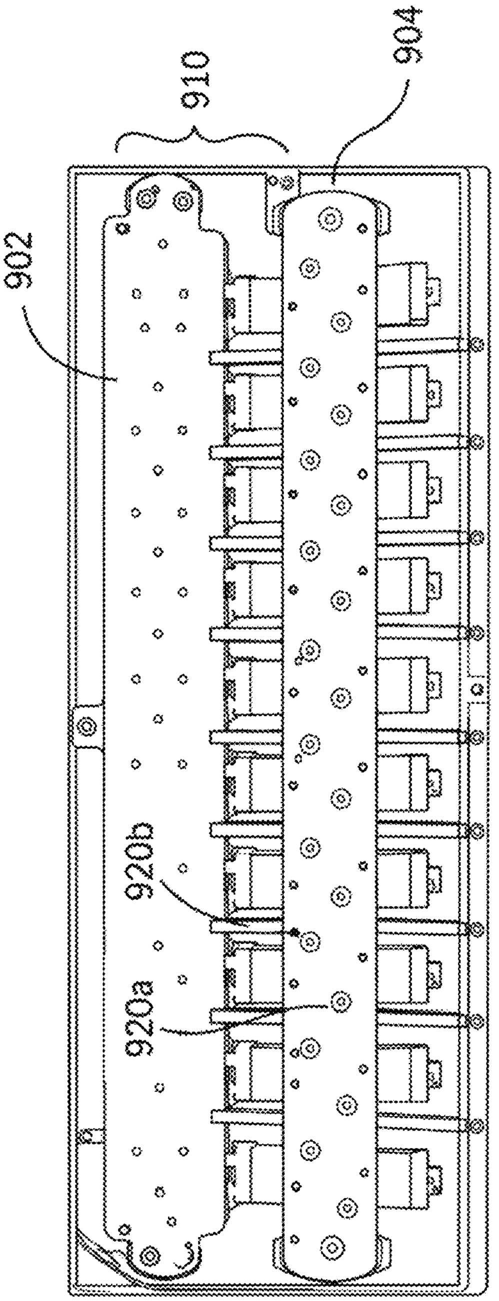
FIG. 10 illustrates aspects of a tray picking flipper gantry.

FIG. 10 illustrates a view of the upper 902 and lower valve block 904 of a vacuum manifold 910, such as may be used in conjunction with the vacuum ports/grippers 620 of FIGS. 9A and B. In the illustration, a 20 position gripper manifold 910 may have 10 internal port offset port pairs 920*a, b*, wherein each manifold offset port of each pair may be comprised of a base-mounted 3-way valve, by way of example. These offset ports 920 may have differing densities, or may be individual ports instead of pairs, for example, dependent upon the item densities of the rows in the pick/place trays.

Thus, in process, the belt drive(s) may move the gantry atop a row of a pick tray; the z-axis drive may lower the flipper bridge and actuate the grippers; and the row of items may be picked from the pick tray. Upon picking, the grippers may remain actuated, while the z-axis drive raises the flipper bridge so as to clear the bridge to flip the items (i.e., the items are of known height). The items are then flipped, and the z-axis may lower the flipper bridge as needed so as to allow for presentation of the flipped items, such as to a secondary end effector of a robot.

The items may then be picked by the secondary end effector and placed into a placement tray, such as may reside on a conveyer at 90 degrees from the pick tray's conveyer. Once the items are picked by the secondary end effector, the flipper bride may be incrementally indexed to the next row of the pick tray by the belt drive(s).

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. A flipping tray picker gantry, comprising:

a flipping bridge associated with an actuating motor;

at least one x-axis drive suitable to move the flipping bridge perpendicularly to a length of rows of items in a pick tray;

at least one z-axis drive suitable to move the flipping bridge both up and down with respect to the pick tray; and a plurality of grippers associated with the flipping bridge and suitable for gripping the items when the flipping bridge moves down in the z-axis, and retaining the items as the flipping bridge moves up in the z-axis and the actuating motor flips the flipping bridge, wherein the grippers are individually actuated.

2. The flipping tray picker gantry of claim 1, wherein the actuating motor is a stepper motor.

3. The flipping tray picker gantry of claim 1, wherein the pick tray is conveyed by a conveyer also running perpendicularly to the at least one x-drive.

4. The flipping tray picker gantry of claim 1, wherein the at least one x-drive comprises two x-drives at opposing ends of the flipping bridge on a frame about the flipping bridge.

5. The flipping tray picker gantry of claim 4, wherein each x-drive comprises a belt drive associated with a drive motor.

6. The flipping tray picker gantry of claim 4, wherein the frame additionally includes front and rear lateral frame centering rails which run perpendicularly to the x-axis drives.

7. The flipping tray picker gantry of claim 1, wherein the at least one x-drive moves sequentially in correspondence to each of the rows of the pick tray.

8. The flipping tray picker gantry of claim 1, wherein the grippers actuate upon z-axis lowering of the flipping bridge, and de-actuate upon hand-off of the items after flipping to a secondary robot.

9. The flipping tray picker gantry of claim 8, wherein the secondary robot places the flipped items in a placement tray.

10. The flipping tray picker gantry of claim 9, wherein the placement tray comprises justifiers to shift a justification of the placed items.

11. The flipping tray picker gantry of claim 1, wherein the flipping bridge is capable of flipping through 360 degrees.

12. The flipping tray picker gantry of claim 1, wherein the flipping bridge is capable of flipping through 180 degrees.

13. The flipping tray picker gantry of claim 1, wherein the grippers are electrically actuated.

14. The flipping tray picker gantry of claim 1, wherein the grippers are mechanical.

15. The flipping tray picker gantry of claim 1, wherein the grippers are pneumatic.

16. The flipping tray picker gantry of claim 1, wherein feed lines to the flipping bridge are fed to the flipping bridge via a slip ring.

17. The flipping tray picker gantry of claim 1, wherein the flipping bridge comprises contact pads to provide electrical connectivity.

18. A flipping tray picker gantry, comprising:

a flipping bridge associated with an actuating motor;

at least one x-axis drive suitable to move the flipping bridge perpendicularly to a length of rows of items in a pick tray;

at least one z-axis drive suitable to move the flipping bridge both up and down with respect to the pick tray; and a plurality of grippers associated with the flipping bridge and suitable for gripping the items when the flipping bridge moves down in the z-axis, and retaining the items as the flipping bridge moves up in the z-axis and the actuating motor flips the flipping bridge, wherein the actuating motor is positionally encoded.

19. A flipping tray picker gantry, comprising:

a flipping bridge associated with an actuating motor;

at least one x-axis drive suitable to move the flipping bridge perpendicularly to a length of rows of items in a pick tray;

at least one z-axis drive suitable to move the flipping bridge both up and down with respect to the pick tray; and a plurality of grippers associated with the flipping bridge and suitable for gripping the items when the flipping bridge moves down in the z-axis, and retaining the items as the flipping bridge moves up in the z-axis and the actuating motor flips the flipping bridge, wherein the flipping bridge includes one or more detachable vacuum clip lines to provide pneumatic connectivity.

* * * * *